United States Patent
Tahboub et al.

(10) Patent No.: US 10,223,244 B2
(45) Date of Patent: Mar. 5, 2019

(54) TEST PLAN INSPECTION PLATFORM

(71) Applicant: Accenture Global Solutions Limited, Dublin (IE)

(72) Inventors: Omar Tahboub, San Jose, CA (US); Alex Kass, Palo Alto, CA (US); Manish Mehta, Sunnyvale, CA (US)

(73) Assignee: Accenture Global Solutions Limited, Dublin (IE)

( * ) Notice: Subject to any disclaimer, the term of this patent is extended or adjusted under 35 U.S.C. 154(b) by 290 days.

(21) Appl. No.: 15/262,952

(22) Filed: Sep. 12, 2016

(65) Prior Publication Data

US 2017/0075793 A1    Mar. 16, 2017

Related U.S. Application Data

(60) Provisional application No. 62/218,832, filed on Sep. 15, 2015.

(51) Int. Cl.
  *G06F 9/44* (2018.01)
  *G06F 11/36* (2006.01)

(52) U.S. Cl.
  CPC ...... *G06F 11/3672* (2013.01); *G06F 11/3664* (2013.01)

(58) Field of Classification Search
  CPC .................................................. G06F 11/3672
  USPC ........................................................ 717/124
  See application file for complete search history.

(56) References Cited

U.S. PATENT DOCUMENTS

| 2010/0153155 | A1  | 6/2010 | Dayasindhu et al. |
| 2015/0178134 | A1* | 6/2015 | Dai ............... G06Q 10/0631 718/104 |
| 2015/0213360 | A1* | 7/2015 | Venanzi .......... G06Q 10/06311 706/12 |

OTHER PUBLICATIONS

Thaun, et al. "Factors Influencing the Decision to Crowdsource: A Systematic Literature Review," Jun. 2015, 34 pages.
(Continued)

*Primary Examiner* — Evral E Bodden
(74) *Attorney, Agent, or Firm* — Harrity & Harrity, LLP (57) ABSTRACT

A device may receive test plan information, associated with a test plan for performing a test of an application, including information associated with a use case for which the application is to be tested. The device may obtain a test plan inspection model, associated with analyzing the test plan, including test plan rules. A test plan rule, of the test plan rules, may be associated with a condition for identifying a crowd-sourcing issue associated with implementing the test plan using crowd-sourced testing. The device may determine, based on the test plan information and the test plan rule, whether the condition is satisfied. The device may identify, based on whether the condition is satisfied, the crowd-sourcing issue as being associated with the test plan. The device may generate a recommendation associated with the crowd-sourcing issue. The device may provide information associated with the crowd-sourcing issue or information associated with the recommendation.

20 Claims, 6 Drawing Sheets

(56) References Cited

OTHER PUBLICATIONS

Software Testing Help, "The Definitive Guide to Crowdsourced Testing (for Testers and Companies),"http://web.archive.org/web/20150628171434/http://www.softwaretestinghelp.com/guide-to-crowdsourced-testing/> , Jun. 28, 2015, 10 pages.

Speidel et al. "Enterprise Crowd Testing," Mar. 2014, TE Testing Experience, 6 pages.

Zogai et al. "Managing Crowdsourced Software Testing: A Case Study Bases Insight on the Challenges of a Crowdsourcing Intermediary," Apr. 2014, Article in Journal of Business Economics, 32 pages.

* cited by examiner

TEST PLAN INSPECTION PLATFORM

RELATED APPLICATION

This application claims priority under 35 U.S.C. § 119 to U.S. Provisional Patent Application No. 62/218,832, filed on Sep. 15, 2015, the content of which is incorporated by reference herein in its entirety.

BACKGROUND

Software testing may be performed to evaluate whether a software application performs functions as required and/or expected, responds correctly to a variety of inputs, works in intended environments, or the like. Crowd-sourced testing is a form of software testing that differs from conventional (e.g., internal) testing. Rather than using internal testers within a limited environment (e.g., such as employees of the software provider), crowd-sourced testing may use a number of different testers from a number of different locations and/or entities.

SUMMARY

According to some possible implementations, a device may include one or more processors to: receive test plan information associated with a test plan for performing a test of an application, where the test plan information may include information associated with a use case for which the application is to be tested; obtain a test plan inspection model associated with analyzing the test plan, where the test plan inspection model may include a plurality of test plan rules, where a test plan rule, of the plurality of test plan rules, may be associated with a condition for identifying a crowd-sourcing issue associated with implementing the test plan using crowd-sourced testing; determine, based on the test plan information and the test plan rule, whether the condition is satisfied; identify, based on whether the condition is satisfied, the crowd-sourcing issue as being associated with the test plan; generate, based on identifying the crowd-sourcing issue, a recommendation associated with the crowd-sourcing issue; and provide information associated with the crowd-sourcing issue or information associated with the recommendation.

According to some possible implementations, a method may include: receiving, by a device, test plan information associated with a test plan for performing an application test, where the test plan information may include information corresponding to a plurality of use cases associated with testing the application; obtaining, by the device, a test plan inspection model associated with analyzing the test plan to identify crowd-sourcing issues associated with implementing the test plan using crowd-sourced testing, where the test plan inspection model may include a test plan rule that identifies a condition for identifying a crowd-sourcing issue associated with implementing the test plan using crowd-sourced testing; determining, by the device and based on the test plan information and the test plan rule, whether the condition is satisfied by the test plan; determining, by the device and based on whether the condition is satisfied, that a crowd-sourcing issue could arise when implementing the test plan using crowd-sourced testing; generating, by the device and based on determining that the crowd-sourcing issue could arise, a recommendation associated with the crowd-sourcing issue; and providing, by the device, information associated with the crowd-sourcing issue or information associated with the recommendation.

According to some possible implementations, a non-transitory computer-readable medium may store instructions that when executed by one or more processors, cause the one or more processors to: receive test plan information associated with a test plan for performing a test of an application, where the test plan information may include information associated with a use case for which the application is to be tested; identify a test plan inspection model, associated with analyzing the test plan, that includes a plurality of test plan rules, where a test plan rule, of the plurality of test plan rules, may be associated with a condition for identifying a crowd-sourcing issue associated with implementing the test plan using crowd-sourced testing; determine, based on the test plan information and the test plan rule, whether the condition is satisfied; identify, based on whether the condition is satisfied, the crowd-sourcing issue as being likely to occur when implementing the test plan using crowd-sourced testing; and provide information associated with the crowd-sourcing issue.

DETAILED DESCRIPTION

The following detailed description of example implementations refers to the accompanying drawings. The same reference numbers in different drawings may identify the same or similar elements.

Software testing, such as quality assurance (QA) testing, typically includes an initial test planning phase. The test planning phase may include creation of a test plan that specifies the ways in which the software is to be tested. Due to its impact on subsequent phases, the test planning phase can be critical to testing the software effectively. Accordingly, it is important for the test plan to effectively specify the use cases for which the software is to be tested.

As conventional software testing may be performed internally, conventional test plans, and conventional testing approaches on which test plans may be based, may not take into account factors that are relevant to crowd-sourced testing. Such factors may include test diversity (e.g., platform, geography, and/or language diversity), specializations/skills (e.g., domain, test delivery, and/or technological specializations or skills), and risk assessment (e.g., confidentiality requirements).

Implementations described herein may provide an inspection platform that inspects a test plan and facilitates additions or changes to the test plan in order to prepare the test plan for implementation using crowd-sourced testing. In some implementations, the inspection platform receives a test plan, analyzes the test plan using a test plan inspection model (e.g., including one or more test plan rules, a specialization ontology, etc.), identifies one or more crowd-sourcing issues associated with implementing the test plan using crowd-sourced testing, and provides one or more recommendations for implementing the test plan using crowd-sourced testing.

In this way, the inspection platform improves implementation of a test plan using crowd-sourced testing. For example, the inspection platform may improve implementation of the test plan by improving accuracy and/or utility of software testing results as compared to a test plan implemented without addressing crowd-sourced testing factors. Further, the inspection platform may improve implementation of the test plan by reducing risk associated with implementing the test plan using crowd-sourced testing (e.g., when confidentiality issues need to be recognized and considered).

Furthermore, the inspection platform may reduce waste and/or usage of resources for implementing a test plan using crowd-sourced testing. For example, the inspection platform may reduce a number of test devices needed for crowd-sourced testing by implementing the test plan in a targeted manner, thereby saving computing resources and/or network resources. Additionally, the inspection platform may reduce waste and/or usage of resources by efficiently implementing a test plan using crowd-sourced testing, which may reduce an amount of time and/or cost (e.g., a monetary cost, a cost in computing or network resources) to implement the test plan.

Figure 1A:
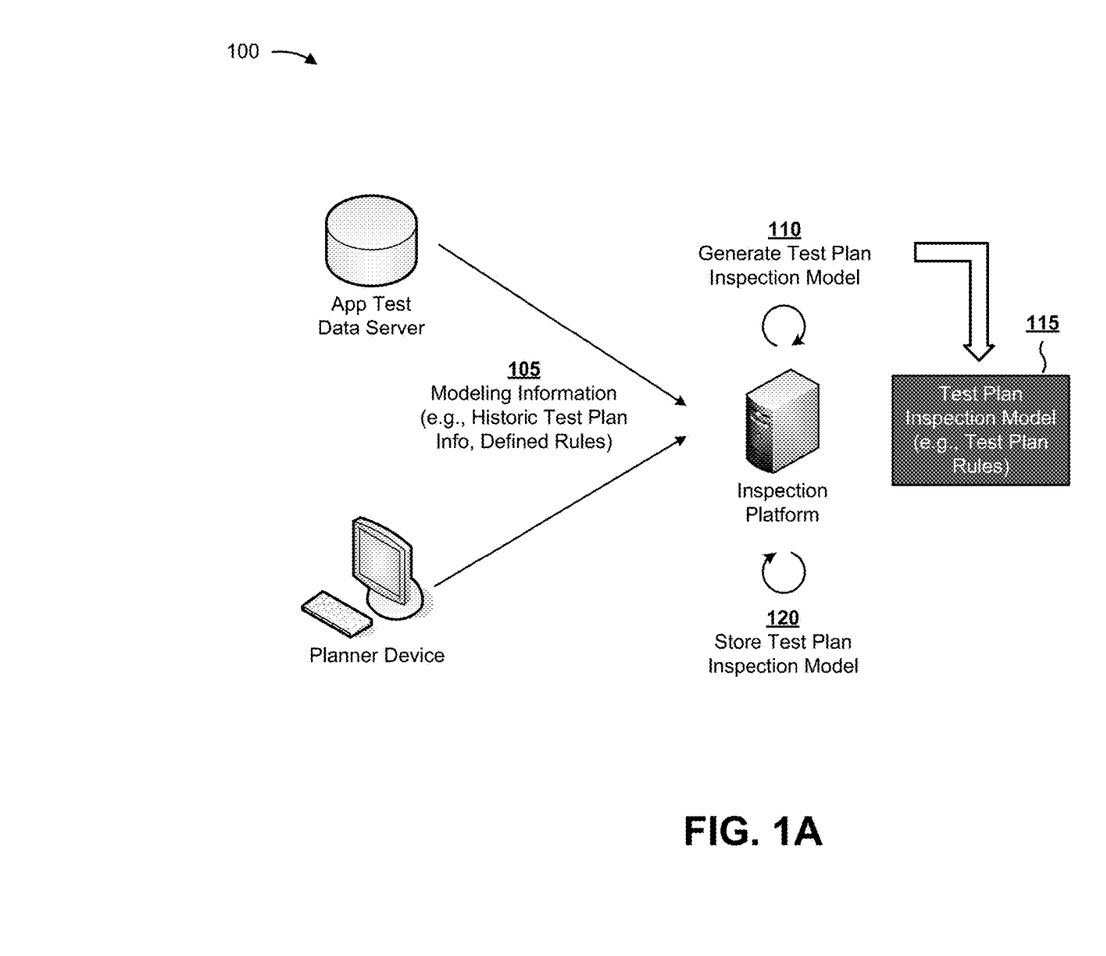
FIGS. 1A and 1B are diagrams of an overview of an example implementation described herein.

FIGS. 1A and 1B are diagrams of an overview of an example implementation 100 described herein. As shown in FIG. 1A, example implementation 100 may include an inspection platform, an application test data server, and a planner device. As shown by reference number 105, the inspection platform may receive, from the application test data server and/or the planner device, modeling information associated with generating a test plan inspection model. The modeling information may include information from historical test plans, information relating to crowd-sourcing issues (e.g., diversity issues, skills/specialization issues, risk assessment issues, etc.), information relating to test plan rules, or the like, from which the test plan inspection model can be generated. As shown by reference number 110, the inspection platform may generate a test plan inspection model based on the modeling information. As shown by reference number 115, the test plan inspection model may include a set of test plan rules associated with analyzing a test plan. The set of test plan rules may include one or more rules used to identify a crowd-sourcing issue associated with a test plan. As shown by reference number 120, the inspection platform may store the test plan inspection model.

Figure 1B:
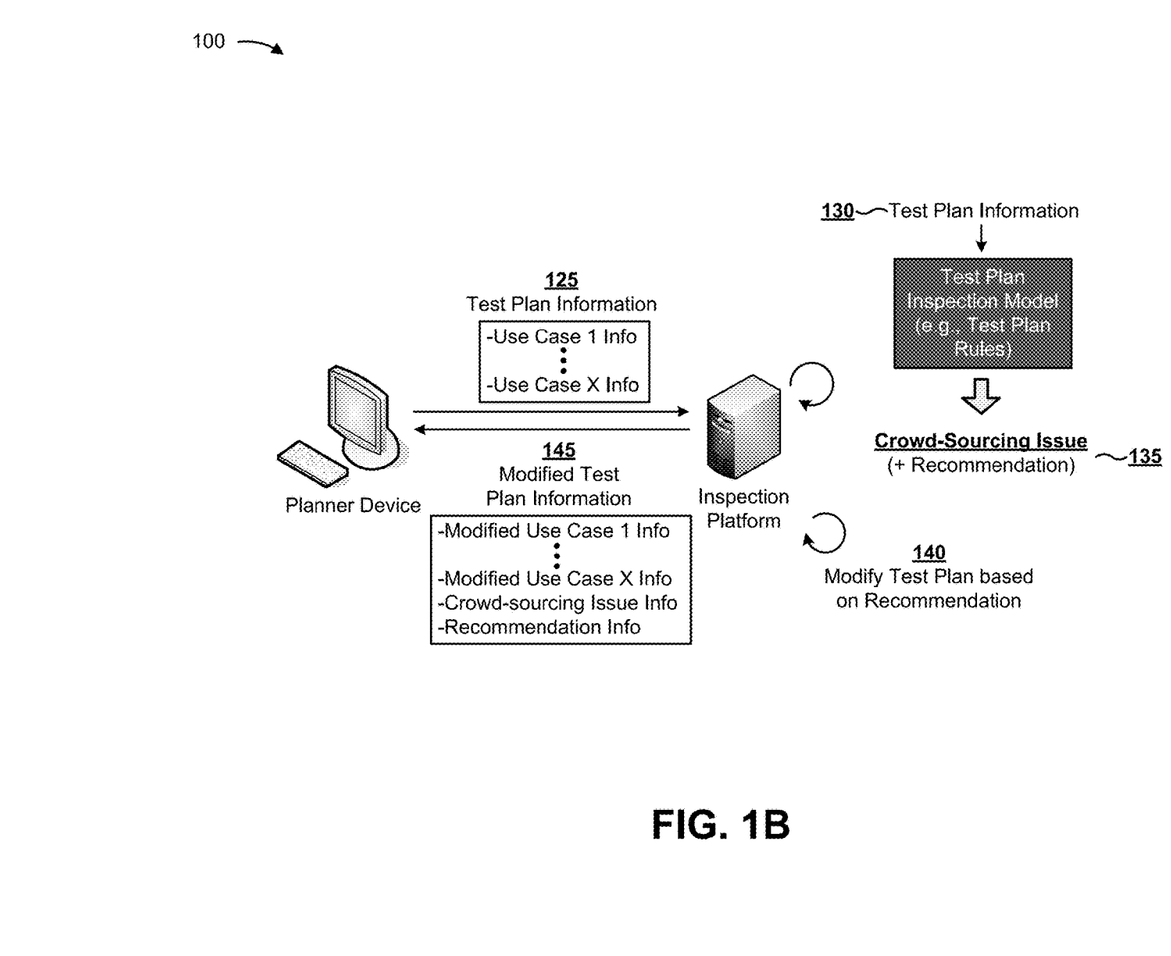

As shown in FIG. 1B, and by reference number 125, the planner device may provide test plan information to the inspection platform. The test plan information may include information associated with a test plan, such as a set of use-cases (e.g., use case 1 through use case X) for a test to be performed (i.e., information associated with one or more circumstances, scenarios, situations, etc., associated with the application, that are to be tested). As shown by reference number 130, the inspection platform may input the test plan information to the test plan inspection model and, as shown by reference number 135, may identify, based on a result of inputting the test plan information to the test plan inspection model, a crowd-sourcing issue associated with utilizing crowd-sourcing to implement the test plan represented by the test plan information.

As shown, in some implementations, the test plan inspection model may also generate a recommendation associated with the crowd-sourcing issue (e.g., a recommendation associated with addressing, mitigating, and/or remediating the crowd-sourcing issue). As shown by reference number 140, the inspection platform may modify the test plan based on the recommendation (e.g., such that the test plan includes information associated with modifying a one or more use cases to address the crowd-sourcing issue, information associated with the recommendation, and/or information associated with the identified crowd-sourcing issue). As shown by reference number 145, the inspection platform may provide modified test plan information to the planner device.

In this way, the inspection platform improves implementation of a test plan using crowd-sourced testing. For example, the inspection platform may improve implementation of the test plan by improving accuracy and/or utility of software testing results as compared to a test plan implemented without addressing crowd-sourced testing factors. Further, the inspection platform may improve implementation of the test plan by reducing risk associated with implementing the test plan using crowd-sourced testing (e.g., when confidentiality issues need to be recognized and considered).

As indicated above, FIGS. 1A and 1B are provided merely as an example. Other examples are possible and may differ from what was described with regard to FIGS. 1A and 1B.

Figure 2:
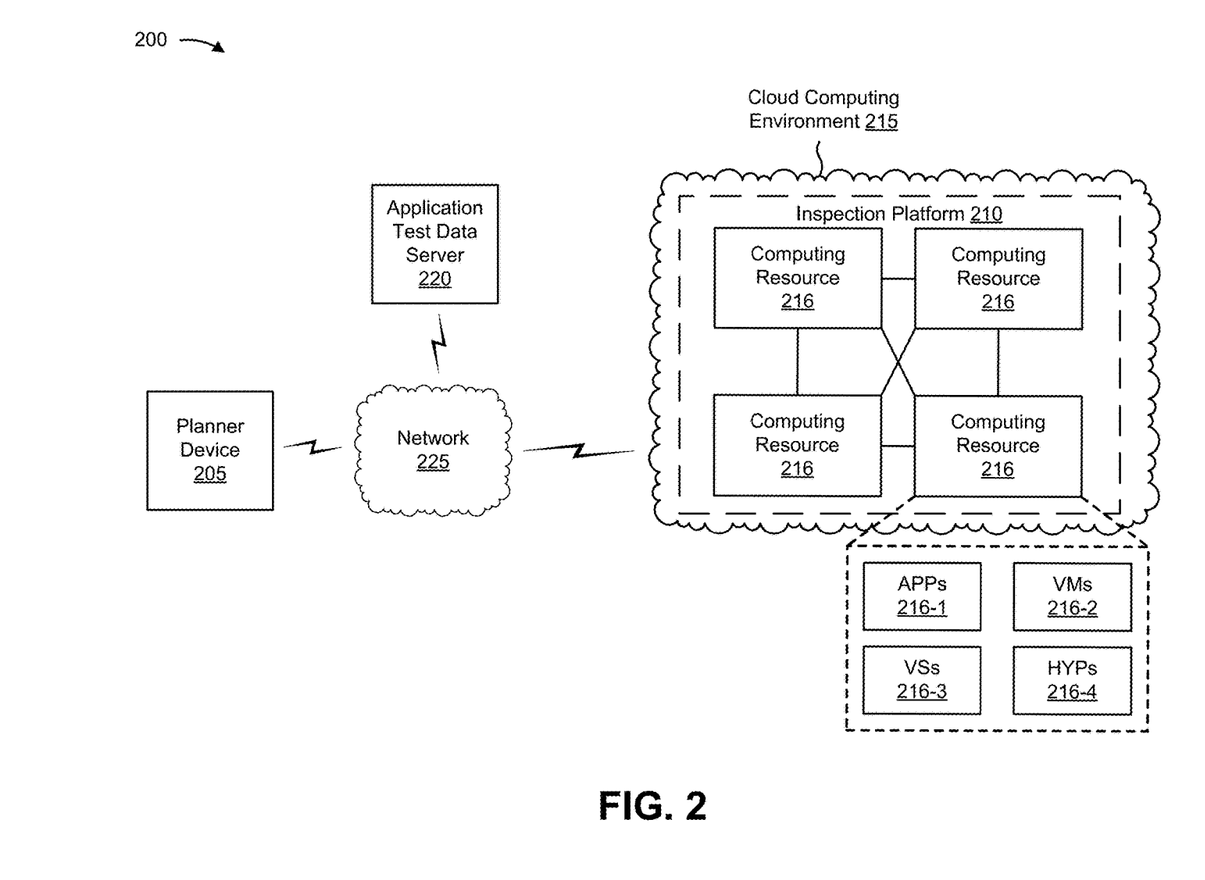
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a planner device 205, an inspection platform 210, an application test data server 220, and a network 225. Devices of environment 200 may interconnect via wired connections, wireless connections, or a combination of wired and wireless connections.

Planner device 205 may include a device capable of receiving, storing, determining, processing, and/or providing information associated with a test plan for performing an application test. For example, planner device 205 may include a communication and/or computing device, such as a mobile phone (e.g., a smart phone, a radiotelephone, etc.), a laptop computer, a tablet computer, a desktop computer, a handheld computer, a server, a group of servers, or a similar type of device.

Inspection platform 210 includes one or more devices capable of generating, storing, and/or accessing a test plan inspection model, and using the test plan inspection model to identify one or more crowd-sourcing issues associated with a test plan, as described elsewhere herein. For example, inspection platform 210 may include a cloud server or a group of cloud servers. In some implementations, inspection platform 210 may be designed to be modular such that certain software components can be swapped in or out depending on a particular need. As such, inspection platform 210 may be easily and/or quickly reconfigured for different uses.

In some implementations, as shown, inspection platform 210 may be hosted in cloud computing environment 215. Notably, while implementations described herein describe inspection platform 210 as being hosted in cloud computing environment 215, in some implementations, inspection platform 210 may not be cloud-based (i.e., may be implemented outside of a cloud computing environment) or may be partially cloud-based.

Cloud computing environment 215 includes an environment that hosts inspection platform 210. Cloud computing environment 215 may provide computation, software, data access, storage, etc. services that do not require end-user (e.g., planner device 205) knowledge of a physical location and configuration of system(s) and/or device(s) that hosts inspection platform 210. As shown, cloud computing environment 215 may include a group of computing resources 216 (referred to collectively as "computing resources 216" and individually as "computing resource 216").

Computing resource 216 includes one or more personal computers, workstation computers, server devices, or other types of computation and/or communication devices. In some implementations, computing resource 216 may host inspection platform 210. The cloud resources may include compute instances executing in computing resource 216, storage devices provided in computing resource 216, data transfer devices provided by computing resource 216, etc. In some implementations, computing resource 216 may communicate with other computing resources 216 via wired connections, wireless connections, or a combination of wired and wireless connections.

As further shown in FIG. 2, computing resource 216 includes a group of cloud resources, such as one or more applications ("APPs") 216-1, one or more virtual machines ("VMs") 216-2, virtualized storage ("VSs") 216-3, one or more hypervisors ("HYPs") 216-4, or the like.

Application 216-1 includes one or more software applications that may be provided to or accessed by planner device 205. Application 216-1 may eliminate a need to install and execute the software applications on planner device 205. For example, application 216-1 may include software associated with inspection platform 210 and/or any other software capable of being provided via cloud computing environment 215. In some implementations, one application 216-1 may send/receive information to/from one or more other applications 216-1, via virtual machine 216-2.

Virtual machine 216-2 includes a software implementation of a machine (e.g., a computer) that executes programs like a physical machine. Virtual machine 216-2 may be either a system virtual machine or a process virtual machine, depending upon use and degree of correspondence to any real machine by virtual machine 216-2. A system virtual machine may provide a complete system platform that supports execution of a complete operating system ("OS"). A process virtual machine may execute a single program, and may support a single process. In some implementations, virtual machine 216-2 may execute on behalf of a user (e.g., planner device 205), and may manage infrastructure of cloud computing environment 215, such as data management, synchronization, or long-duration data transfers.

Virtualized storage 216-3 includes one or more storage systems and/or one or more devices that use virtualization techniques within the storage systems or devices of computing resource 216. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 216-4 may provide hardware virtualization techniques that allow multiple operating systems (e.g., "guest operating systems") to execute concurrently on a host computer, such as computing resource 216. Hypervisor 216-4 may present a virtual operating platform to the guest operating systems, and may manage the execution of the guest operating systems. Multiple instances of a variety of operating systems may share virtualized hardware resources.

Application test data server 220 may include a device capable of receiving, storing, determining, processing, and/or providing modeling information from which a test plan inspection model may be generated. For example, application test data server 220 may include a server or a group of servers. In some implementations, application test data server 220 may provide modeling information, associated with one or more historical test plans, to inspection platform 210 such that inspection platform 210 may generate a test plan inspection model based on the modeling information.

Network 225 includes one or more wired and/or wireless networks. For example, network 225 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
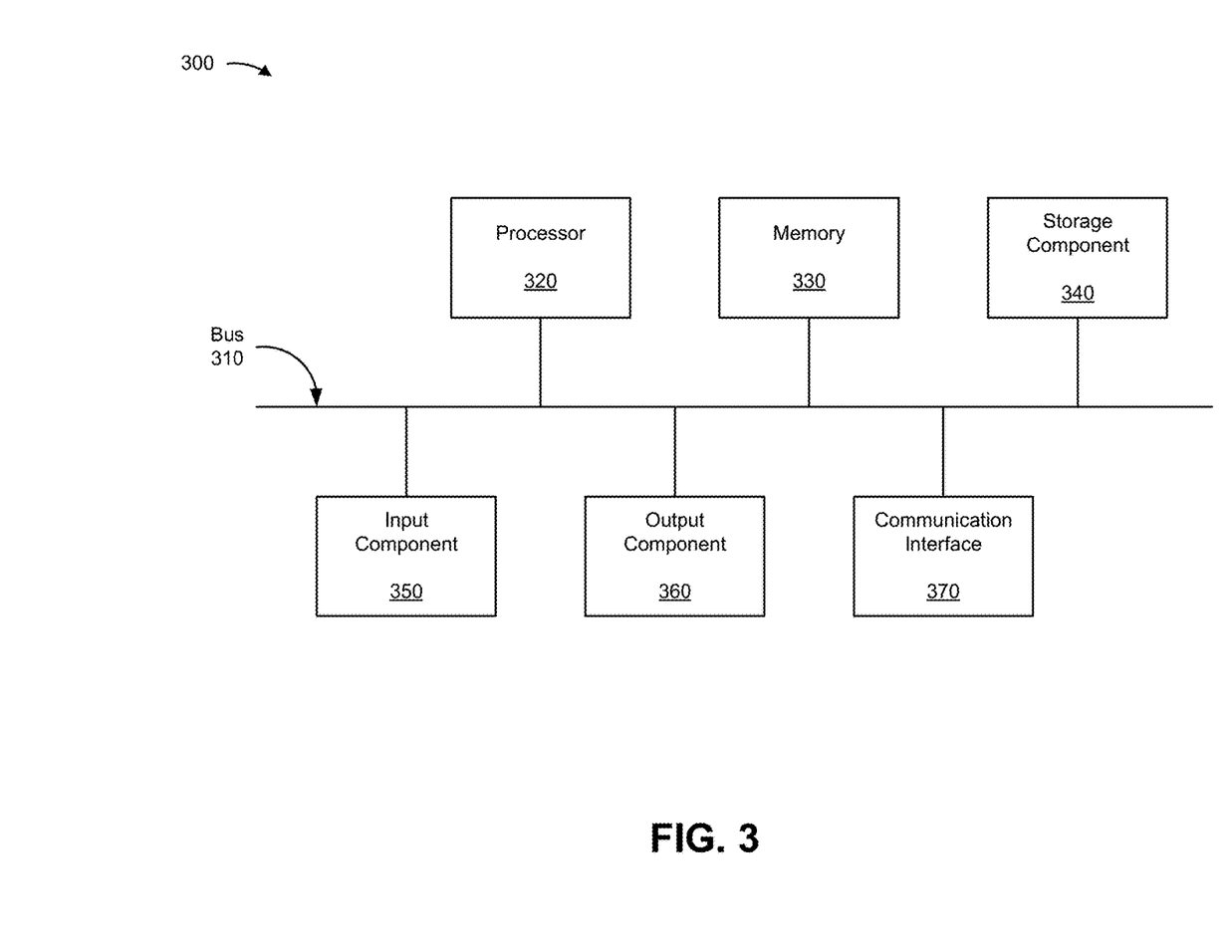
FIG. 3 is a diagram of example components of one or more devices of FIG. 2.

FIG. 3 is a diagram of example components of a device 300. Device 300 may correspond to planner device 205, inspection platform 210, and/or application test data server 220. In some implementations, planner device 205, inspection platform 210, and/or application test data server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
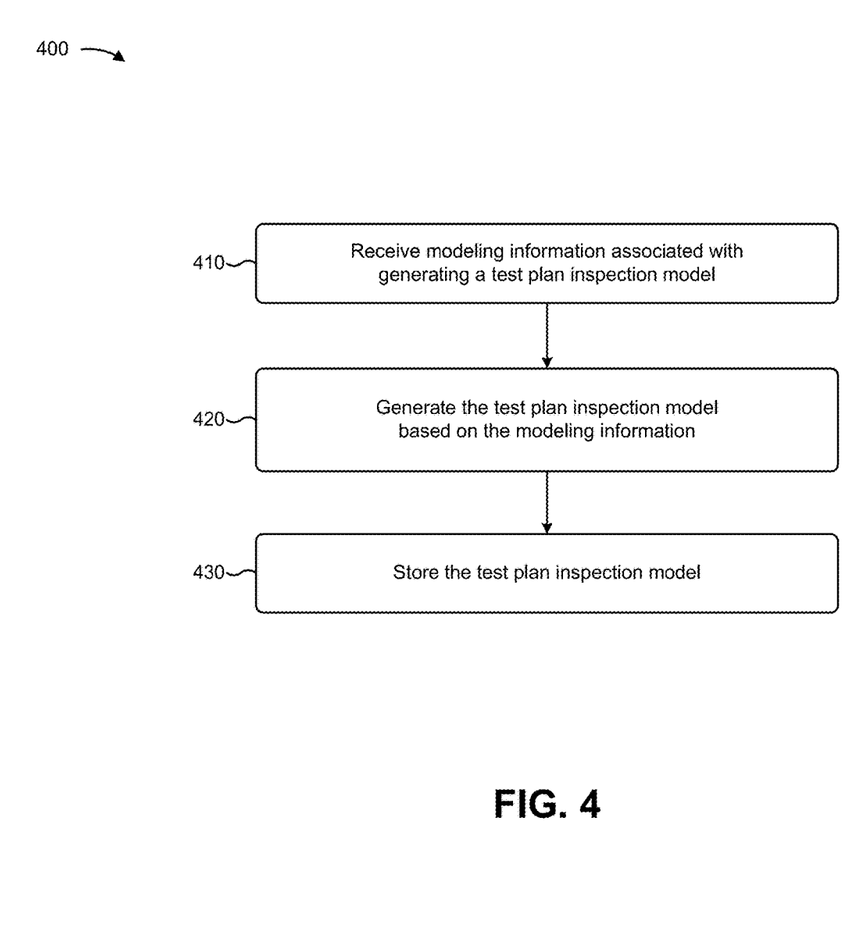
FIG. 4 is a flow chart of an example process for generating a test plan inspection model for analyzing a test plan.

FIG. 4 is a flow chart of an example process 400 for generating a test plan inspection model for analyzing a test plan. In some implementations, one or more process blocks of FIG. 4 may be performed by inspection platform 210. In some implementations, one or more process blocks of FIG. 4 may be performed by another device or a group of devices separate from or including inspection platform 210, such as planner device 205 and/or application test data server 220.

As shown in FIG. 4, process 400 may include receiving modeling information associated with generating a test plan inspection model (block 410). For example, inspection platform 210 may receive modeling information associated with generating a test plan inspection model. In some implementations, the test plan inspection model may include a model associated with processing (e.g., inspecting, analyzing, refining, etc.) a test plan for implementation using crowd-sourced testing, as described herein.

In some implementations, the modeling information may include information associated with a historic test plan (e.g., a previously generated and/or previously implemented test plan). For example, the modeling information may include initial test plan information that is associated with an initial version of the historic test plan (e.g., before refinement for implementation using crowd-sourced testing). As another example, the modeling information may include refined test plan information that is associated with a refined version of the historic test plan (e.g., after analysis by a test plan manager and/or inspection platform 210 for implementation using crowd-sourced testing). In this way, inspection platform 210 may identify refinements, alterations, updates, changes, or the like, to an initial version of the historic test plan that was updated for implementation using crowd-sourced testing. In some implementations, inspection platform 210 may receive modeling information associated with multiple historic test plans.

In some implementations, the modeling information may include crowd-sourcing issue information. For example, the modeling information may include information identifying a crowd-sourcing issue, or lack thereof, encountered when implementing the historic test plan using crowd-sourced testing. In some implementations, the crowd-sourcing issue may include a test diversity issue (e.g., a geography diversity issue, a language diversity issue, or a platform diversity issue), a skills/specialization issue (e.g., a domain specialization issue, a test delivery specialization issue, or a technological specialization issue), a risk assessment issue (e.g., a confidentiality risk), or the like. Additional description regarding examples of possible crowd-sourcing issues are described below with regard to FIG. 5. In some implementations, based on receiving the crowd-sourcing issue information, inspection platform 210 may correlate issues, experienced when implementing the historic test plan using crowd-sourced testing, to initial and refined versions of the historic test plan.

In some implementations, the modeling information may include internal test plan information associated with a test plan implemented internally within an entity (i.e., without crowd-sourced testing). In this case, the modeling information may include information associated with a result of the internally implemented test plan.

Additionally, or alternatively, the modeling information may include specialization ontology information. For example, the specialization ontology information may include information associated with a domain (e.g., healthcare, finance, e-commerce, etc.), technology, testing delivery, or the like. In some implementations, the specialization ontology information may include information associated with a hierarchal organization of a skill or specialization. In some implementations, the specialization ontology information may be associated with an ontology that is based on standard practice and/or an organizational taxonomy of specializations.

Additionally, or alternatively, the modeling information may include test plan rule information. In some implementations, the test plan rule information may identify a test plan rule (e.g., provided by a test plan manager) that is to be incorporated into the test plan inspection model. For example, the test plan rule may include a rule indicating that, when a test plan generically identifies a particular geographic area (e.g., South America) for implementation of the test plan, inspection platform 210 is to detect a crowd-sourcing issue (e.g., based on test plan manager knowledge that crowd-sourced testing in some areas of South America may be difficult and/or complex). In some implementations, the test plan rule may be incorporated in the test plan inspection model, along with one or more test plan rules generated based on other modeling information, as described below.

In some implementations, inspection platform 210 may receive the modeling information from planner device 205 (e.g., based on input from a user, such as a test plan manager). Additionally, or alternatively, inspection platform 210 may receive the modeling information from application test data server 220 and/or one or more test devices (e.g., associated with implementing a historic test plan) that store one or more defined test plan rules and/or information associated with one or more historic test plans.

As further shown in FIG. 4, process 400 may include generating the test plan inspection model based on the modeling information (block 420). For example, inspection platform 210 may generate the test plan inspection model based on the modeling information. As will be described herein, in some implementations, inspection platform 210 may analyze a test plan based on the test plan inspection model.

In some implementations, inspection platform 210 may analyze the modeling information and generate a test plan inspection model that includes a set of test plan rules. Here, a test plan rule may include a rule based on which a crowd-sourcing issue may be identified. For example, the rule may indicate that a presence of a particular set of conditions, identified in a test plan, indicates that a particular crowd-sourcing issue may be expected. In some implementations, inspection platform 210 may determine an indicator (e.g., a crowd-sourcing issue score) of a significance or a likelihood (e.g., a probability) of a crowd-sourcing issue arising.

As an example, a test plan rule may indicate that, when a test plan generically identifies a platform on which a test is to be carried out (e.g., Apple™ and Android™), a test diversity issue may arise. As a particular example, the test plan rule may indicate that a platform diversity issue may arise when the historical test plan information indicates that such generic platform descriptions have led to crowd-sourced test results associated with multiple (i.e., different) specific versions of the platform(s) identified. Further to the example, inspection platform 210 may determine a score representing a significance or likelihood of the test diversity issue based on a number of platform versions (e.g., device types, devices, software versions, etc.) that exist for the identified platforms.

As another example, a test plan rule may indicate that, when a test plan broadly identifies a geography in which a test is to be carried out (e.g., North and South America), a test diversity issue may arise. As a particular example, the test plan rule may indicate that a geography diversity issue may arise based on the number and/or variety of different countries that exist in North and South America (e.g., when infrastructure and/or compliance requirements across different countries make implementation across some countries difficult and/or complex). Further to the example, inspection platform 210 may determine a score representing a likelihood or significance of the test geography issue based on a number of countries within the identified geography.

As still another example, a test plan rule may indicate that, when a test plan specifies testing with respect to a particular domain (e.g., online payment), a domain specialization issue may arise. As a particular example, a domain specialization issue may arise that is associated with the online payment domain (e.g., testers may be required to have online banking expertise). Further to the example, inspection platform 210 may determine a score representing a significance of the test specialization issue.

In some implementations, the test plan rule may include a recommendation associated with the crowd-sourcing issue corresponding to the rule. For example, inspection platform 210 may identify a manner in which the crowd-sourcing issue was successfully addressed for a historical test plan, and may associate the test plan rule with information that identifies the technique used to address the crowd-sourcing issue.

In some implementations, the test plan may identify multiple recommendations. In this case, inspection platform 210 may generate a recommendation score, associated with each recommendation (e.g., to indicate a success rate for each recommendation). For example, inspection platform 210 may generate a higher recommendation score for a recommendation that has been indicated to provide more test coverage than other recommendations in previous test plans. As another example, inspection platform 210 may generate a higher recommendation score for a recommendation that requires less expenditure of money or other resources to implement than other recommendations.

In some implementations, the test plan inspection model may include a hierarchy of interrelated rules (e.g., when an outcome of a first rule indicates a second rule is to be applied). In some implementations, the set of test plan rules may incorporate one or more defined rules included in the modeling information.

Additionally, or alternatively, the set of test plan rules may be associated with the specialization ontology information. For example, inspection platform 210 may generate a set of rules that correspond to a set of sub-domains included in a hierarchical organization of a domain. As another example, inspection platform 210 may generate a set of rules associated with a particular testing delivery and technology ontology.

As further shown in FIG. 4, process 400 may include storing the test plan inspection model (block 430). For example, inspection platform 210 may store the test plan inspection model (e.g., in a memory location accessible by inspection platform 210).

In some implementations, inspection platform 210 may update the test plan inspection model (e.g., after storage and/or creation of the test plan inspection model). For example, inspection platform 210 may receive (e.g., based on user input, from another device, etc.) new and/or additional modeling information (e.g., associated with a test plan implemented after generation of the test plan inspection model). As another example, inspection platform 210 may receive modeling information in the form of feedback associated with a previously implemented test plan. In this case, inspection platform 210 may update (e.g., modify, train, etc.) the test plan inspection model based on the new and/or additional modeling information in a manner similar to that described above. In this way, inspection platform 210 may continue to improve the test plan inspection model after initial storage and/or generation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
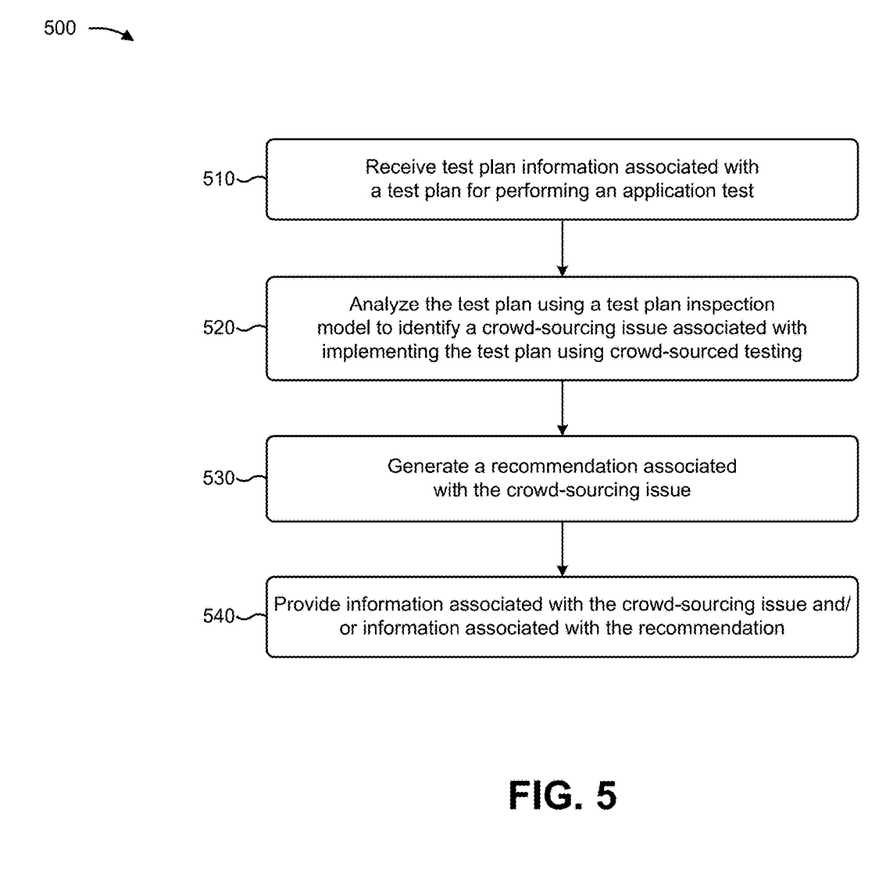
FIG. 5 is a flow chart of an example process for identifying a crowd-sourcing issue associated with a test plan, and providing information associated with the crowd-sourcing issue and/or a recommendation associated with the crowd-sourcing issue.

FIG. 5 is a flow chart of an example process 500 for identifying a crowd-sourcing issue associated with a test plan, and providing information associated with the crowd-sourcing issue and/or a recommendation associated with the crowd-sourcing issue. In some implementations, one or more process blocks of FIG. 5 may be performed by inspection platform 210. In some implementations, one or more process blocks of FIG. 5 may be performed by another device or a group of devices separate from or including inspection platform 210, such as planner device 205, and/or application test data server 220.

As shown in FIG. 5, process 500 may include receiving test plan information associated with a test plan for performing an application test (block 510). For example, inspection platform 210 may receive the test plan information associated with a test plan for performing an application test. In some implementations, the test plan information may include information associated with a test plan for performing QA testing for a software application.

In some implementations, the test plan information may include information associated with a set of use-cases (e.g., scenarios for which the application is to be tested). For a given use-case, the test plan information may include any combination of types of information relevant to testing an application. For example, the test plan information may include a description of what aspect of the application is associated with the use-case (e.g., uploading a file, creating a profile, exporting a file, etc.).

As another example, the test plan information may include geography information representing a geography where the use-case is to be tested (e.g., a continent, a country, a state, or the like). As still another example, the test plan information may include platform information representing a platform on which the use-case is to be tested (e.g., an operating system, a version of an operating system, etc.). As yet another example, the test plan information may include language information representing a language in which the use-case is to be tested (e.g., English, Spanish, Japanese, etc.).

As another example, the test plan information may include confidentiality information representing a confidentiality level (e.g., low, medium, high) associated with the use-case. As still another example, the test plan information may include domain knowledge information that identifies domain knowledge needed for the use-case (e.g., whether a familiarity with a particular domain is needed for the use-case, such as healthcare, energy, finance, or the like). As yet another example, the test plan information may include specialization information that identifies a specialization or technological skill or skill level needed for the use-case (e.g., familiarity with a particular program code).

As another example, the test plan information may include quantity information that identifies a number of tests desired to be performed for the use-case. As still another example, the test plan information may include schedule information that represents a time frame for performing testing associated with the use-case (e.g., a start date, an end date, a deadline, a particular time period during which testing is to be performed, etc.).

In some implementations, inspection platform 210 may receive the test plan information based on user input. For example, a test plan manager may provide, to planner device 205, user input associated with the test plan information. Additionally, or alternatively, inspection platform 210 may receive the test plan information from another device. For example, another device may generate the test plan, and may provide the test plan information to inspection platform 210.

As further shown in FIG. 5, process 500 may include analyzing the test plan using a test plan inspection model to identify a crowd-sourcing issue associated with implementing the test plan using crowd-sourced testing (block 520). For example, inspection platform 210 may analyze the test plan to identify the crowd-sourcing issue associated with implementing the test plan using crowd-sourced testing. In some implementations, inspection platform 210 may analyze the test plan using the test plan inspection model stored by inspection platform 210 in the manner described above.

In some implementations, inspection platform 210 may provide the test plan information as input to the test plan inspection model, and may receive, as output, information that identifies one or more crowd-sourcing issues associated with implementing the test plan using crowd-sourced testing. For example, inspection platform 210 may compare items of test plan information to conditions identified by the set of test plan rules, associated with the test plan inspection model, in order to identify a test plan rule that is applicable to the test plan. Here, inspection platform 210 may determine whether one or more conditions, corresponding to the applicable test plan rule, is satisfied by the items of test plan information. Here, inspection platform 210 may identify one or more crowd-sourcing issues, corresponding to the applicable test plan rule, when the one or more conditions are (or are not) satisfied. In some implementations, inspection platform 210 may identify multiple applicable test plan rules, and may identify crowd-sourcing issues, accordingly. In some implementations, inspection platform 210 may identify one or more crowd-sourcing issues associated with one or more use-cases included in the test plan information.

In some implementations, the crowd-sourcing issue may include an issue (e.g., a complexity, a difficulty, a problem, or the like) that may be experienced when implementing the test plan using crowd-sourced testing. For example, the crowd-sourcing issue may include a test diversity issue, such as a geography diversity issue related to performing the test in a geography identified in one or more use-cases included in the test plan information, a language diversity issue related to performing the test for a language identified in one or more use-cases included in the test plan information, a platform diversity issue related to performing the test on a platform identified in one or more use-cases included in the test plan information, or the like.

As another example, the crowd-sourcing issue may include a skills/specialization issue, such as a domain specialization issue related to performing the test for a domain identified in one or more use-cases included in the test plan information, a delivery specialization issue related to delivering the test in a manner identified in one or more use-cases included in the test plan information, a technology specialization issue related to a technology identified in one or more use-cases included in the test plan information, or the like.

As still another example, the crowd-sourcing issue may include a risk assessment issue associated with performing the test in accordance with a confidentiality level identified in one or more use-cases included in the test plan information.

As yet another example, the crowd-sourcing issue may include another type of information associated with implementing the test plan using crowd-sourced testing. In some implementations, the crowd-sourcing issue may be related to one or more items of test plan information (e.g., the crowd-sourcing issue may be geography-related and risk assessment-related).

As shown in FIG. 5, process 500 may include generating a recommendation associated with the crowd-sourcing issue (block 530). For example, For example, inspection platform 210 may generate the recommendation associated with the crowd-sourcing issue. In some implementations, inspection platform 210 may generate a recommendation associated with the crowd-sourcing issue identified using the test plan inspection model. In some implementations, inspection platform 210 may generate the recommendation based on the set of test plan rules included in the test plan model (e.g., when a rule is associated with a recommendation).

In some implementations, the recommendation may include information associated with a manner in which the crowd-sourcing issue may be addressed, mitigated, remediated, or the like, when implementing the test plan using crowd-sourced testing. For example, the recommendation may include a suggestion to revise, modify, and/or edit a particular item of test plan information (e.g., a suggestion to provide clarity and/or specificity to a geographic location identified in the test plan information). As another example, the recommendation may include a suggestion to remove an item of test plan information (e.g., a suggestion to remove a requirement to test a use-case on a particular operating system). As still another example, the recommendation may include a suggestion to add an item of test plan information (e.g., a suggestion to add a language in which to test a use-case).

In some implementations, inspection platform 210 may generate multiple recommendations associated with a single crowd-sourcing issue and may provide a recommendation score, associated with each recommendation (e.g., to indicate a success rate for each recommendation (e.g., such that the test plan manager may select a recommendation).

Additionally, or alternatively, inspection platform 210 may generate one or more recommendations associated with one or more crowd-sourcing issues identified based on one or more applicable test plan rules.

As further shown in FIG. 5, process 500 may include providing information associated with the crowd-sourcing issue and/or information associated with the recommendation (block 540). For example, inspection platform 210 may provide information associated with the crowd-sourcing issue and/or information associated with the recommendation.

In some implementations, inspection platform 210 may provide information associated with the crowd-sourcing issue. For example, inspection platform 210 may provide information that identifies the crowd-sourcing issue in order to notify the test plan manager of the crowd-sourcing issue. Additionally, or alternatively, inspection platform 210 may provide information associated with the recommendation.

In some implementations, inspection platform 210 may automatically generate a modified test plan that includes the information associated with the crowd-sourcing issue and/or the information associated with the recommendation. In this case, the test plan manager may be provided with a test plan that allows the test plan manager to readily identify the crowd-sourcing issues and the associated recommendations.

In some implementations, an action may be automatically performed (e.g., by inspection platform 210, by planner device 205, etc.) based on providing the information associated with the crowd-sourcing issue and/or the information associated with the recommendation. For example, inspection platform 210 may automatically update the test plan and request approval by a test plan manager. As another example, inspection platform 210 may send the modified test plan to a third-party for a cost estimate. As yet another example, inspection platform 210 may provide a modified test plan to application test data server 220 for future use as a historic test plan on which future test plan inspection models may be based.

As still another example, inspection platform 210 may provide a test plan manager with a means to select or reject individual recommendations, and/or to select or reject options or alternatives within recommendations, such as selecting specific countries from a list of countries associated with a recommendation. Further to the example, inspection platform 210 may provide the test plan manager with information (e.g., a recommendation score) indicating a likelihood of success associated with remediating and/or mitigating a crowdsourcing issue corresponding to each recommendation and/or each option.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As described above, inspection platform 210 may identify a crowd-sourcing issue associated with implementing the test plan using crowd-sourced testing, and may provide one or more recommendations for implementing the test plan using crowd-sourced testing.

As an example, in testing a multimedia messenger mobile application, inspection platform 210 may identify (e.g., by applying a test plan rule) a crowd-sourcing issue (e.g., a platform diversity issue) when a test plan generically identifies a platform on which the test is to be carried out (e.g., Apple and Android), based on a large number of versions (e.g., device types, devices, software versions, etc.) associated with Apple and Android platforms. Based on identifying the platform diversity issue, inspection platform 210 may provide a recommendation (e.g., based on experience compiled in similar use-cases) to test a limited number and/or a particular set of versions that are likely to achieve a sufficient test coverage, at a reasonable cost, within a reasonable amount of time.

In some implementations, inspection platform 210 may provide a mechanism (e.g., including a user interface) via which a device (e.g., planner device 205, inspection platform 210, etc.) may provide information to a user and may receive instructions from the user to refine the granularity of platform configurations to be tested. For example, inspection platform 210 may provide a means for selection of specific versions of a platform, and/or approving a recommendation associated with which versions should be included in a test. Additionally, or alternatively, inspection platform 210 may provide information associated with the crowd-sourcing issue, the recommendation, or the like, to application test data server for potential use in future test plan analysis.

As another example, in testing a same or similar multimedia messenger mobile application, inspection platform 210 may identify (e.g., by applying a test plan rule) a crowd-sourcing issue (e.g., a geography diversity issue) when a test plan broadly identifies a geography in which a test is to be carried out (e.g., North and South America), based on a large number of countries that are included within the identified geography. Based on identifying the geography diversity issue, inspection platform 210 may provide a recommendation (e.g., based on experience compiled in similar use-cases) to test a limited number of countries (e.g., USA, Canada, Mexico, Brazil and Argentina) that are likely to achieve a sufficient test coverage.

In some implementations, inspection platform 210 may provide a mechanism (e.g., including a user interface) via which a device (e.g., planner device 205, inspection platform 210, etc.) may provide information to a user and may receive instructions from the user to refine the granularity of geographical locations to be tested. For example, inspection platform 210 may provide a means for selection of specific countries, and/or approving a recommendation associated with which countries should be included in a test. Additionally, or alternatively, inspection platform 210 may provide information associated with the crowd-sourcing issue, the recommendation, or the like, to application test data server for potential use in future test plan analysis.

As still another example, in testing a specific type of software application such as an online payment system, inspection platform 210 may identify (e.g., by applying a test plan rule) a crowd-sourcing issue (e.g., a skills/specialization issue) when a test plan identifies a particular domain (e.g., online payment), based on specialized domain expertise (e.g., online banking expertise) that testers would be required to have in order to test the software. Based on identifying the test specialization issue, inspection platform 210 may provide a recommendation to only use testers with online banking expertise and/or to target the crowd-sourced testing to take place in a particular geography, on a particular platform, or the like.

In some implementations, inspection platform 210 may provide a mechanism (e.g., including a user interface) via which a device (e.g., planner device 205, inspection platform 210, etc.) may provide information to a user and may receive instructions to refine the granularity of domain expertise to be required. For example, inspection platform 210 may utilize an ontology from the user (e.g., provide a mechanism to refine detail of a set of domain specializations by means of comprehensive hierarchical domain specializations relevant to online payments). Additionally, or alternatively, inspection platform 210 may provide information associated with the crowd-sourcing issue, the recommendation, or the like, to application test data server for potential use in future test plan analysis.

Implementations described herein may provide an inspection platform that receives a test plan, analyzes the test plan using a test plan inspection model, identifies one or more crowd-sourcing issues associated with implementing the test plan using crowd-sourced testing, and provides one or more recommendations for implementing the test plan using crowd-sourced testing and/or addressing, mitigating, or remediating the one or more crowd-sourcing issues.

In this way, the inspection platform improves implementation of a test plan using crowd-sourced testing. For example, the inspection platform may improve implementation of the test plan by improving accuracy and/or utility of software testing results as compared to a test plan implemented without addressing crowd-sourced testing factors. Further, the inspection platform may improve implementation of the test plan by reducing risk associated with implementing the test plan using crowd-sourced testing (e.g., when confidentiality issues need to be recognized and considered).

Furthermore, the inspection platform reduces waste and/or usage of resources for implementing a test plan using crowd-sourced testing. For example, the inspection platform may reduce a number of test devices needed for crowd-sourced testing by implementing the test plan in a targeted manner, thereby saving computing resources and/or network resources. Additionally, the inspection platform reduces waste and/or usage of resources by efficiently implementing a test plan using crowd-sourced testing, which may reduce an amount of time and/or cost to implement the test plan.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive test plan information associated with a test plan for performing a test of an application,
         the test plan information including information associated with a use case for which the application is to be tested;
      obtain a test plan inspection model associated with analyzing the test plan,
         the test plan inspection model including a plurality of test plan rules,
            a test plan rule, of the plurality of test plan rules, being associated with a condition for identifying a crowd-sourcing issue associated with implementing the test plan using crowd-sourced testing;
      determine, based on the test plan information and the test plan rule, whether the condition is satisfied;

identify, based on whether the condition is satisfied, the crowd-sourcing issue as being associated with the test plan;
generate, based on identifying the crowd-sourcing issue, a recommendation associated with the crowd-sourcing issue; and
provide information associated with the crowd-sourcing issue or information associated with the recommendation.

2. The device of claim 1, where the one or more processors are further to:
receive historical test plan information associated with a plurality of historical test plans,
the historical test plan information including information associated with an initial version of a historical test plan and a refined version of the historical test plan;
create, based on the historical test plan information, the plurality of test plan rules;
generate the test plan inspection model based on the plurality of test plan rules; and
where the one or more processors, when obtaining the test plan inspection model, are to:
obtain the test plan inspection model based on generating the test plan inspection model.

3. The device of claim 1, where the crowd-sourcing issue includes at least one of:
a test diversity issue associated with implementing the test plan using crowd-sourced testing;
a skills/specialization issue associated with implementing the test plan using crowd-sourced testing; or
a risk assessment issue associated with implementing the test plan using crowd-sourced testing.

4. The device of claim 1, where the one or more processors are further to:
generate a crowd-sourcing issue score associated with the crowd-sourcing issue,
the crowd-sourcing issue score being an indicator of a significance or a likelihood of the crowd-sourcing issue arising; and
provide information associated with the crowd-sourcing issue score.

5. The device of claim 1, where the one or more processors are further to:
generate a recommendation score associated with the recommendation,
the recommendation score indicating a likelihood of success for remediating the crowd-sourcing issue when implementing the recommendation; and
provide information associated with the recommendation score.

6. The device of claim 1, where the one or more processors are further to:
modify, based on the crowd-sourcing issue and the recommendation, the test plan to create a modified test plan; and
where the one or more processors, when providing the information associated with the crowd-sourcing issue or the information associated with the recommendation, are to:
provide the modified test plan.

7. The device of claim 1, where the one or more processors are further to:
update the test plan inspection model based on the crowd-sourcing issue or the recommendation.

8. A method, comprising:
receiving, by a device, test plan information associated with a test plan for performing an application test,
the test plan information including information corresponding to a plurality of use cases associated with testing the application;
obtaining, by the device, a test plan inspection model associated with analyzing the test plan to identify crowd-sourcing issues associated with implementing the test plan using crowd-sourced testing,
the test plan inspection model including a test plan rule that identifies a condition for identifying a crowd-sourcing issue associated with implementing the test plan using crowd-sourced testing;
determining, by the device and based on the test plan information and the test plan rule, whether the condition is satisfied by the test plan;
determining, by the device and based on whether the condition is satisfied, that a crowd-sourcing issue could arise when implementing the test plan using crowd-sourced testing;
generating, by the device and based on determining that the crowd-sourcing issue could arise, a recommendation associated with the crowd-sourcing issue; and
providing, by the device, information associated with the crowd-sourcing issue or information associated with the recommendation.

9. The method of claim 8, further comprising:
receiving historical test plan information, associated with a historical test plan, that includes information associated with an initial version of the historical test plan and a refined version of the historical test plan;
creating, based on the historical test plan information, the test plan rule;
generating the test plan inspection model based on the test plan rule; and
where obtaining the test plan inspection model comprises:
obtaining the test plan inspection model based on generating the test plan inspection model.

10. The method of claim 8, where the crowd-sourcing issue includes at least one of:
a test diversity issue associated with implementing the test plan using crowd-sourced testing;
a skills/specialization issue associated with implementing the test plan using crowd-sourced testing; or
a risk assessment issue associated with implementing the test plan using crowd-sourced testing.

11. The method of claim 8, further comprising:
generating a crowd-sourcing issue score associated with the crowd-sourcing issue,
the crowd-sourcing issue score being an indicator of a significance or a likelihood of the crowd-sourcing issue arising; and
providing information associated with the crowd-sourcing issue score.

12. The method of claim 8, further comprising:
generating a recommendation score associated with the recommendation,
the recommendation score indicating a likelihood of success for remediating the crowd-sourcing issue when implementing the recommendation; and
providing information associated with the recommendation score.

13. The method of claim 8, further comprising:
modifying, based on the crowd-sourcing issue and the recommendation, the test plan to create a modified test plan; and where providing the information associated with the crowd-sourcing issue or the information associated with the recommendation comprises:
providing the modified test plan.

14. The method of claim 8, where the recommendation is a first recommendation, and
where the method further comprises:
generating, based on determining that the crowd-sourcing issue could arise, a second recommendation associated with the crowd-sourcing issue; and
providing information associated with the second recommendation.

15. A non-transitory computer-readable medium storing instructions, the instructions comprising:
one or more instructions that, when executed by one or more processors, cause the one or more processors to:
receive test plan information associated with a test plan for performing a test of an application,
the test plan information including information associated with a use case for which the application is to be tested;
identify a test plan inspection model, associated with analyzing the test plan, that includes a plurality of test plan rules,
a test plan rule, of the plurality of test plan rules, being associated with a condition for identifying a crowd-sourcing issue associated with implementing the test plan using crowd-sourced testing;
determine, based on the test plan information and the test plan rule, whether the condition is satisfied;
identify, based on whether the condition is satisfied, the crowd-sourcing issue as being likely to occur when implementing the test plan using crowd-sourced testing; and
provide information associated with the crowd-sourcing issue.

16. The non-transitory computer-readable medium of claim 15, where the one or more instructions, when executed by the one or more processors, further cause the one or more processors to:
generate, based on identifying the crowd-sourcing issue, a recommendation associated with the crowd-sourcing issue; and
provide information associated with the recommendation.

17. The non-transitory computer-readable medium of claim 16, where the one or more instructions, when executed by the one or more processors, further cause the one or more processors to:
generate a recommendation score associated with the recommendation,
the recommendation score indicating a likelihood of success for mitigating the crowd-sourcing issue when implementing the recommendation; and
provide information associated with the recommendation score.

18. The non-transitory computer-readable medium of claim 15, where the one or more instructions, when executed by the one or more processors, further cause the one or more processors to:
receive historical test plan information associated with a plurality of historical test plans implemented using crowd-sourced testing;
create, based on the historical test plan information, the plurality of test plan rules;
generate the test plan inspection model based on the plurality of test plan rules; and
where the one or more instructions, that cause the one or more processors to identify the test plan inspection model, cause the one or more processors to:
identify the test plan inspection model based on generating the test plan inspection model.

19. The non-transitory computer-readable medium of claim 15, where the one or more instructions, when executed by the one or more processors, further cause the one or more processors to:
generate a crowd-sourcing issue score associated with the crowd-sourcing issue,
the crowd-sourcing issue score being an indicator of a significance or a likelihood of the crowd-sourcing issue arising; and
provide information associated with the crowd-sourcing issue score.

20. The non-transitory computer-readable medium of claim 15, where the test plan rule is a first test plan rule, the condition is a first condition, and the crowd-sourcing issue is a first crowd-sourcing issue, and
where the one or more instructions, when executed by the one or more processors, further cause the one or more processors to:
identify a second test plan rule, of the plurality of test plan rules, that is associated with a second condition for identifying a second crowd-sourcing issue associated with implementing the test plan using crowd-sourced testing;
determine, based on the test plan information and the second test plan rule, whether the second condition is satisfied;
identify, based on whether the second condition is satisfied, the second crowd-sourcing issue as being likely to occur when implementing the test plan using crowd-sourced testing; and
provide information associated with the second crowd-sourcing issue.

* * * * *